May 30 1950  E. G. LICKTEIG  2,510,048
DISCHARGE VALVE HEADER ASSEMBLY
Filed May 10, 1946

INVENTOR.
BY Edward G. Lickteig
Harness & Harris
Attorneys

Patented May 30, 1950

2,510,048

UNITED STATES PATENT OFFICE 2,510,048

DISCHARGE VALVE HEADER ASSEMBLY

Edward G. Lickteig, Van Buren, Ohio, assignor to Chrysler Corporation, Highland Park, Mich., a corporation of Delaware Application May 10, 1946, Serial No. 668,962

3 Claims. (Cl. 251—119)

My present invention relates to the construction and manufacture of a discharge valve assembly for use in compressing mechanisms. The assembly is principally designed for refrigeration and air conditioning compressors but may be used for compressing air or other gases. The principal object of my invention is to make a more durable construction than heretofore known and one which is easier to manufacture.

A further object of my invention is to make a valve assembly, all parts of which for small sizes of compressors, may be made of sheet metal stampings, thereby eliminating the expense of machining castings and eliminating a possible source of failure since small castings are likely to break under the pressures and shocks to which they are subjected in use.

A further object of my invention is to provide a discharge valve assembly adapted to seat in a cylindrical seat in a compressor, which is guided at top and bottom by members held to exact dimensions, thus providing assurance against the assembly becoming cocked in its seat and assuring freedom of movement of the entire assembly to release excessive pressures which may sometimes develop in the compressing of refrigerant gases.

Figure 1:
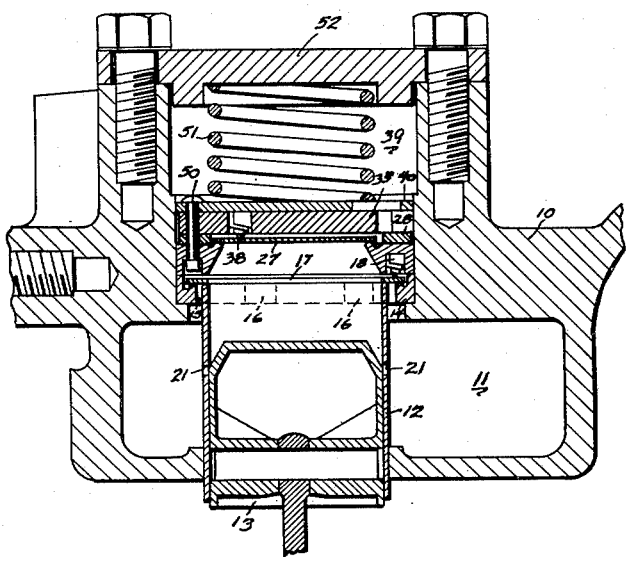
Figure 2:
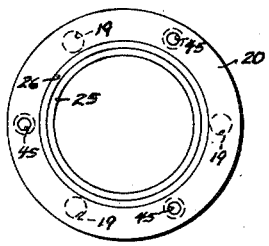
Figure 3:
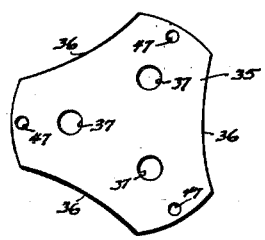
Figure 4:
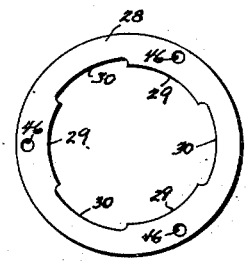
Figure 5:
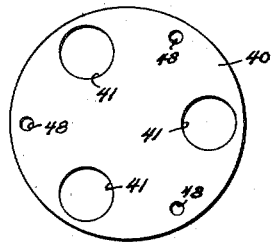
Figure 6:
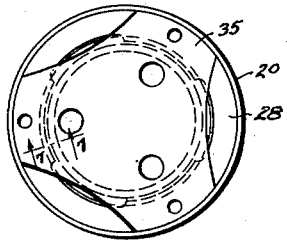
Figure 7:
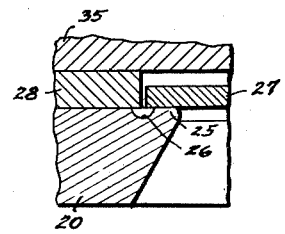

These and other objects and advantages of my invention will be apparent to those skilled in the art from a study of the following specification and drawings wherein like numerals refer to like parts throughout. In the drawings Fig. 1 discloses a piston and valve assembly of a compressing mechanism having my invention applied thereto; Fig. 2 is a plan view of a valve seat member forming a part of the assembly; Fig. 3 is a plan view of a spring retainer forming a portion of the assembly; Fig. 4 is a plan view of a valve spacer ring forming a portion of the assembly; Fig. 5 is a plan view of a spring retainer disk forming a portion of the assembly; Fig. 6 is a plan view of a partial assembly having the valve seat member, the valve, the spacer ring and the spring retainer imposed in proper relationship to each other; and Fig. 7 is a partial cross section on a greatly magnified scale taken substantially along line 7—7 of Fig. 6.

Figs. 1 to 6 inclusive are drawn to a scale substantially twice the actual dimensions of a small size compressing unit employing my invention. A portion 10 of a compressor housing is illustrated as being provided with a suction space 11 within which is mounted a cylindrical sleeve 12 having a piston 13 reciprocating therein. The outer end of the sleeve 12 is provided with a flange 14 having gas admission ports 15 therethrough, the flange being held to the sleeve by spaced integral portions 16. The upper face of the flange 14 and the upper edge of the cyinder are provided with spaced annular valve seats and a surrounding valve guide extension adapted to seat and guide, respectively, an annular suction valve 17. The compression of the gas on the compressing stroke of the piston forces the suction valve against the spaced seats, the compression being aided by volute springs 18 mounted in spring retainer openings 19 in the lower face of an annular member 20 forming a portion of the discharge valve assembly and adapted to seat upon the outer extended suction valve guiding edge of the flange 14. On the suction stroke of the piston the rarification of the gas in the cylinder space causes the greater pressure of the gas in the suction space 11 to lift the suction valve 17 against the force of the springs 18 and permit gas to flow into the cylinder space through the openings 15. At the bottom of the suction stroke gas may also be admitted to the cylinder space through auxiliary ports 21 in the sleeve 12.

The inner face of the discharge valve seating member is conical as illustrated to receive the truncated type piston illustrated, but a straight-sided, dished head, or other type of pistons may be used and the member 20 shaped accordingly without departing from my invention. The upper face of the member 20 is provided with a discharge valve seat 25 surrounded by an annular groove 26. The outer edge of a disk valve 27 is seated upon the valve seat 25 and is held in proper relation by a spacer ring 28, the inner face of which is provided with spaced valve guiding portions separated by gas escape recesses 30 adapted to extend beyond the groove 26 in the member 20. When the valve 27 is raised from its seat the compressed gas may flow through the groove and escape upwardly through the recesses 30. The thickness of the retainer ring 28 is greater than the thickness of the disk valve 27 so that the valve may be raised from its seat against the lower face of a spring retainer member 35 having portions seated upon the spaced ring and spaced recesses 36 registering with the gas escape recesses of the spacer ring. The spring retainer is provided with a plurality of vertical openings 37 each adapted to receive a volute spring 38 tending to hold the disk valve on its seat 25 during the suction stroke of the piston. During the compression stroke of the piston the pressure within the cylinder becomes greater than the pressure in the discharge head space 39 so that the disk valve raises to permit the escape of gas from the cylinder. A spring retainer disk 40 is seated upon the spring retainer 35 and is provided with a plurality of gas escape ports 41 registering with the recesses 30 and 36 to permit the passage of compressed gas into the discharge space 39 which is connected to the refrigerating system (not shown), the refrigerating system being also connected to the suction space 11 in the usual manner.

The annular member 20 is provided with a plurality of openings 45, the spacer ring is provided with a plurality of openings 46, the spring retainer is provided with a plurality of openings 47 and the spring retainer disk is provided with a plurality of openings 48, the openings 45, 46, 47 and 48 being aligned and adapted to receive assembly retaining means, such as rivets 50 which are passed through the openings and headed when the assembly is completed. Bolts may be substituted for the rivets 50 but I prefer rivets so as to make a shake-proof assembly.

The outer diameter of the annular member 20 and the outer diameter of the spring retainer disk 40 are equal, both being held to exact dimensions and smoothly finished so that the discharge valve assembly may be accurately seated in its place. The outer diameter of the spring retainer 35 and the spacer ring 28 are lesser than the first two mentioned diameters, hence, the outer faces of these members need not be smoothly finished or accurately fixed. The annular member and the spring retainer disk thus provide spaced guides for the discharge valve assembly preventing the assembly from becoming cocked in its seat and assuring possibility of vertical movement of the assembly as a whole against the compression of a pressure relief spring 51 compressed between the spring retainer disk and the cylinder head 52, and providing means to permit the relief of excessive pressure if such should develop during the operation of the compressor.

Having illustrated and described a preferred embodiment of my invention I claim as my invention all such modifications in detail and arrangement thereof as come within the scope of the following claims.

I claim:

1. A discharge valve assembly comprising an annular member having a valve seat on its upper face adjacent its inner periphery, a disk valve seated on said seat, an annular spacer ring surrounding said disk valve and having spaced guiding portions along its inner face and gas escape recesses therebetween, a spring retainer seated on said spacer ring and having spaced recesses registering with the gas escape recesses of said spacer ring and a plurality of spring retaining openings overlying said valve therein, a spring mounted in each of said openings, a spring retainer disk seated on said spring retainer and having gas escape ports registering with said recesses and portions overlying said springs to compress them against said valve, said spacer ring being thicker than said valve whereby vertical movement of said valve is permitted, and means retaining said member, valve, ring, retainer, springs and disk in assembled relation.

2. The construction set forth in claim 1 wherein the outer diameter of said member is the same as the outer diameter of said disk, and the outer diameters of said ring and said retainer are lesser, whereby only the first two need to be made to close tolerances to seat the assembly in its place.

3. A plate valve comprising a first member having an opening therethrough and a valve seat formed thereon around the periphery of said opening, a valve plate adapted to seat on said valve seat, a hollow ring surrounding said valve plate and secured to said first member, said ring having a portion thereof adapted to guide said valve plate when the latter is moved on its axis, said ring having a greater axial thickness than said valve plate and being so constructed and arranged as to provide fluid flow communication with the opening in said first member when said valve plate is unseated, a second member secured to said ring and providing a stop to limit axial movement of said valve plate, said second member having a hole extending therethrough, a spring positioned in said hole and in engagement with said valve plate, said second member being so constructed and arranged as to provide means for the flow of fluid from said ring past said second member and a backing plate secured to said second member and adapted to provide a surface against which said spring reacts, said backing plate being so constructed and arranged as to permit said fluid to pass thereby.

EDWARD G. LICKTEIG.

REFERENCES CITED

The following references are of record in the file of this patent:

UNITED STATES PATENTS

| Number | Name | Date |
|---|---|---|
| 1,359,006 | Wardwell | Nov. 16, 1920 |
| 1,695,069 | Tuttle | Dec. 11, 1928 |

FOREIGN PATENTS

| Number | Country | Date |
|---|---|---|
| 501,720 | France | of 1920 |

Certificate of Correction

Patent No. 2,510,048 May 30, 1950

EDWARD G. LICKTEIG

It is hereby certified that errors appear in the printed specification of the above numbered patent requiring correction as follows:

Column 2, line 39, after the word "portions" insert *29*; line 49, for "spaced", first occurrence, read *spacer*;

and that the said Letters Patent should be read with these corrections therein that the same may conform to the record of the case in the Patent Office.

Signed and sealed this 22nd day of August, A. D. 1950.

[SEAL]

THOMAS F. MURPHY,
*Assistant Commissioner of Patents.*